United States Patent
Neuer et al.

(10) Patent No.: US 7,533,380 B2
(45) Date of Patent: May 12, 2009

(54) INSTALLATION TOOL FOR ENTERPRISE MANAGEMENT SYSTEMS BASED ON BUILDING BLOCKS

(75) Inventors: Peter Neuer, Malsch (DE); Robert Viehmann, Mühlhausen-Tairnbach (DE); Norbert Kujus, Heidelberg (DE)

(73) Assignee: SAP AG, Walldorf (DE)

( * ) Notice: Subject to any disclaimer, the term of this patent is extended or adjusted under 35 U.S.C. 154(b) by 579 days.

(21) Appl. No.: 10/406,294

(22) Filed: Apr. 4, 2003

(65) Prior Publication Data

US 2003/0229891 A1 Dec. 11, 2003

Related U.S. Application Data

(60) Provisional application No. 60/386,591, filed on Jun. 5, 2002.

(51) Int. Cl.
*G06F 9/44* (2006.01)
*G06F 9/445* (2006.01)

(52) U.S. Cl. .................. 717/177; 717/168; 717/172; 717/174

(58) Field of Classification Search ......... 717/168–178; 705/1–45
See application file for complete search history.

(56) References Cited

U.S. PATENT DOCUMENTS

| | | | | |
|---|---|---|---|---|
| 5,367,686 A * | 11/1994 | Fisher et al. | ................. | 717/174 |
| 5,950,010 A * | 9/1999 | Hesse et al. | ................. | 717/178 |
| 5,960,404 A * | 9/1999 | Chaar et al. | ..................... | 705/8 |
| 6,158,001 A * | 12/2000 | Lee et al. | ........................ | 713/1 |
| 6,381,742 B2 * | 4/2002 | Forbes et al. | ................. | 717/176 |
| 6,407,761 B1 * | 6/2002 | Ching et al. | ................. | 345/835 |
| 6,418,554 B1 | 7/2002 | Delo et al. | ..................... | 717/11 |
| 6,473,771 B1 * | 10/2002 | Zimniewicz et al. | ...... | 707/104.1 |
| 6,523,166 B1 | 2/2003 | Mishra et al. | ................. | 717/11 |
| 6,560,776 B1 * | 5/2003 | Breggin et al. | .............. | 717/176 |
| 6,588,011 B1 | 7/2003 | Giammaria | .................. | 717/174 |
| 6,598,225 B1 | 7/2003 | Curtis et al. | ................. | 717/175 |
| 6,904,449 B1 * | 6/2005 | Quinones | ..................... | 709/203 |
| 6,968,551 B2 * | 11/2005 | Hediger et al. | .............. | 717/174 |
| 2002/0004935 A1 * | 1/2002 | Huotari et al. | ................. | 717/11 |
| 2002/0104080 A1 * | 8/2002 | Woodard et al. | ............ | 717/176 |
| 2002/0133814 A1 * | 9/2002 | Bourke-Dunphy et al. | .. | 717/174 |

(Continued)

OTHER PUBLICATIONS

Ruediger Buck-Emden and Peter Zencke, "mySAP CRM: The Official Guidebook to SAP CRM 4.0," p. 57 (2004).

(Continued)

*Primary Examiner*—Lewis A Bullock, Jr.
*Assistant Examiner*—Jason Mitchell
(74) *Attorney, Agent, or Firm*—Kenyon & Kenyon LLP

(57) ABSTRACT

An installation tool is proposed for EMS systems in which the operation of a business logic portion is defined by a settings portion. According to the embodiment, the installation tool includes a plurality of "building blocks," modular increments of settings information that is sufficient to establish a predetermined business process within the EMS system. As part of the installation process, an operator may select one or more building blocks from among a library of the blocks. The selected building blocks may be added to an installation container. Once all desired building blocks have been selected, the EMS system may be installed on a target system, using the container's building blocks to define the settings on which the EMS system will operate.

15 Claims, 4 Drawing Sheets

U.S. PATENT DOCUMENTS

| | | | |
|---|---|---|---|
| 2003/0182656 A1* | 9/2003 | Leathers et al. | 717/177 |
| 2004/0034850 A1* | 2/2004 | Burkhardt et al. | 717/120 |
| 2004/0054764 A1* | 3/2004 | Aderton et al. | 709/223 |
| 2004/0181771 A1* | 9/2004 | Anonsen et al. | 717/102 |
| 2004/0187140 A1* | 9/2004 | Aigner et al. | 713/310 |

OTHER PUBLICATIONS

Wikipedia, "Business Process," available at http://en.wikipedia.org/wiki/Business_Process (last visited Oct. 14, 2007).

Peter Neuer, "The Secret to Accerlarated SAP Implementations: SAP Best Practices," SAP Insider, Oct.-Dec. 2005.

Enterprise Architecture Online User Group, "Using Enterprise Architecture Framework to Map Services and Set Their Granularity," Apr. 19, 2007, available at http://www.theeagroup.net/ea/Default.aspx?tabid=39&mid=357&ctl=Details&ItemID=7 (last visited Mar. 13, 2008).

Franchesco di Cugno et al., "Building-Blocks Selection based on Business Processes Semantics for SAP R/3," Proceedings of the ISWC 2005 Workshop on Semantic Web Case Studies and Best Practices for eBusiness, Nov. 7, 2005, available at http://ftp.informatik.rwth-aachen.de/Publications/CEUR-WS/Vol-155.

SAP, "SAP Building Block Library (US)," available at http://help.sap.com/bestpractices/BBLibrary/bblibrary_start.htm (last visited Mar. 13, 2008).

SAP, "H33: Configuration Product Design and Engineering," available at http://help.sap.com/bestpractices/BBLibrary/html/H33_ProdDesEng_EN_US.htm (last visited Mar. 13, 2008).

SAP, "Building Block: J04—Sales and Distribution," available at http://help.sap.com/bestpractices/BBLibrary/html/J04_SD_EN_US.htm (last visited Mar. 13, 2008).

SAP, "Building Block: Self-Billing Automotive," available at http://help.sap.com/bestpractices/BBLibrary/html/A11_SelfBillingAuto_EN_US.htm (last visited Mar. 13, 2008).

SAP, "Best Practices Building Block Concept," SAP Best Practices, 2003.

SAP, "SAP Building Block Library," available at http://help.sap.com/bestpractices/BBLibrary/bblibrary_start.htm (last visited Mar. 13, 2008).

* cited by examiner

100

200

1000

INSTALLATION TOOL FOR ENTERPRISE MANAGEMENT SYSTEMS BASED ON BUILDING BLOCKS

CROSS-REFERENCE TO RELATED APPLICATION

This application claims benefit of priority of U.S. Patent Application Ser. No. 60/386,591, filed Jun. 5, 2002, the disclosure of which is incorporated herein by reference.

BACKGROUND

The present invention relates to an installation tool for use in enterprise management software ("EMS") systems and, in particular, to an installation tool that provides a library of prefabricated installation options for the EMS system.

EMS systems are software systems typically designed to manage the operations of some of the largest companies in the world. EMS systems typically are designed for large scale system applications, involving perhaps tens of thousands of users. They are intended to manage most of the business processes that a company finds necessary in its operation, including for example, supply-chain management ("SCM"), customer relationship management ("CRM"), product lifecycle management ("PLM") and enterprise resource planning ("ERP"), among others. While it can be expected that operations in many business functions are similar from company to company, other business functions are markedly different. Business functions in areas such as supply-chain management and product lifecycle management depend heavily on the industries in which a given company practices and the goods and services that the company provides within those industries. Indeed, business processes even in areas where companies face generic issues, such as human resources, vary from company to company as those companies design business processes to handle their unique needs.

Given the vast differences in the business processes of each company, EMS systems have been developed having a flexible architecture to accommodate them. FIG. 1 provides a simplified block diagram illustrating one such architecture. There, an EMS system 100 is illustrated as including a business logic portion 110 and a settings portions 120. When installed on a customer's system, the business logic 110 executes and interoperates with customer data 130 provided on one or more database systems.

As noted, the EMS system 100 possesses a flexible architecture. The business logic 110 may contain tens of thousands of software modules to perform various incremental functions. These modules may be interrelated with each other in almost limitless ways to define business processes at the customer site. To conform the business logic 110 of an EMS system 100 to the business processes of a given customer, installers write settings information 120 identifying exactly how the various modules are to operate, how they interact with each other and how they interact with the customer's data 130. The act of defining the settings information is one of customization—it requires software consultants that have expertise in the architecture of the business logic software 110 and also in the needs of the customer. Defining the settings often is performed using a project-based approach, requiring years of planning, design, drafting and testing before the business logic 110 software may be installed for use by a particular customer.

Commercial deployment of EMS systems 100 has involved software publishers, installers and, of course, customers. The software publisher creates the business logic software 110 with its attendant flexibility. When a customer purchases the EMS software 100 for installation, the customer typically contracts with an installer, defines its requirements and requests the installer to design the settings 120 that will cause the business logic 110 to operate in accordance with the customer's desired business processes. In practice, some installers develop expertise in particular commercial markets (e.g., the automotive industry, pharmaceutical industries, banking). These installers may have insights into their market of expertise that permit them to assist their customers to define desired business processes. Because the process of designing settings 120 and installing the EMS system 100 on a customer platform is an act of customizing the EMS system 100 for a particular application, this process is expensive.

Based on the high implementation cost traditionally associated with EMS systems, EMS systems traditionally have been considered inappropriate for use by small or mid-sized business. These entities traditionally have been unwilling to accept the high installation costs associated with EMS systems. The inventors have identified a need in the art, however, for a tool that can reduce the cost of installation of an EMS system.

DETAILED DESCRIPTION

Embodiments of the present invention provide an improved installation tool for EMS systems having an open design. According to the embodiment, the installation tool includes a plurality of "building blocks," settings information that is sufficient to establish a predetermined business process within the EMS system. As part of the installation process, an operator may select one or more building blocks from among a library of the blocks. The selected building blocks may be added to an installation container. Once all desired building blocks have been selected, the EMS system may be installed on a target system, using the container's building blocks to define the settings on which the EMS system will operate.

The present invention capitalizes on a realization that, while typically no two EMS installations are exactly alike, a reasonable amount of redundancy is present across customer installations in various industries. For this reason, some EMS publishers have partnered with installers in various industries to define "best practices," installation tips and tricks to optimize performance of the EMS system in those industries. The present invention provides an installation tool to extend best practices to a wider range of customers than previously thought possible.

Building blocks also may be provided to cover technical procedures to be performed at the customer site. For example, a customer's installation may be distributed across multiple servers and multiple databases in a wide area network. Building blocks may be provided to define settings information to implement communication processes among the servers and databases.

Figure 1:
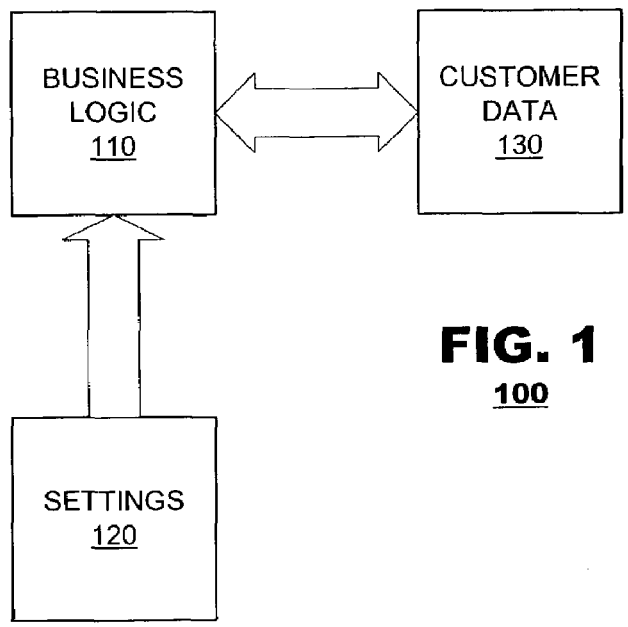
FIG. 1 is a diagram of the architecture of an installed EMS system.
Figure 2:
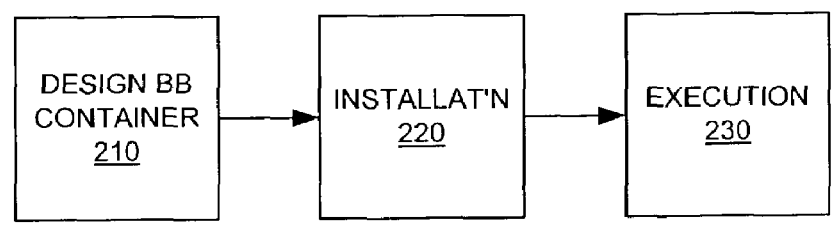
FIG. 2 is a diagram illustrating the role of an installation tool according to an embodiment of the present invention.

FIG. 2 is a diagram illustrating the use of building blocks during deployment of an EMS system, according to an embodiment of the present invention. The first stage of deployment causes an installer to build a building block container 210. Thereafter, installation is performed from the container 220 and, if the installation is successful, the EMS system executes at the customer site 230. The installation and execution need not differ from the installation and execution processes of prior EMS systems.

Figure 3:
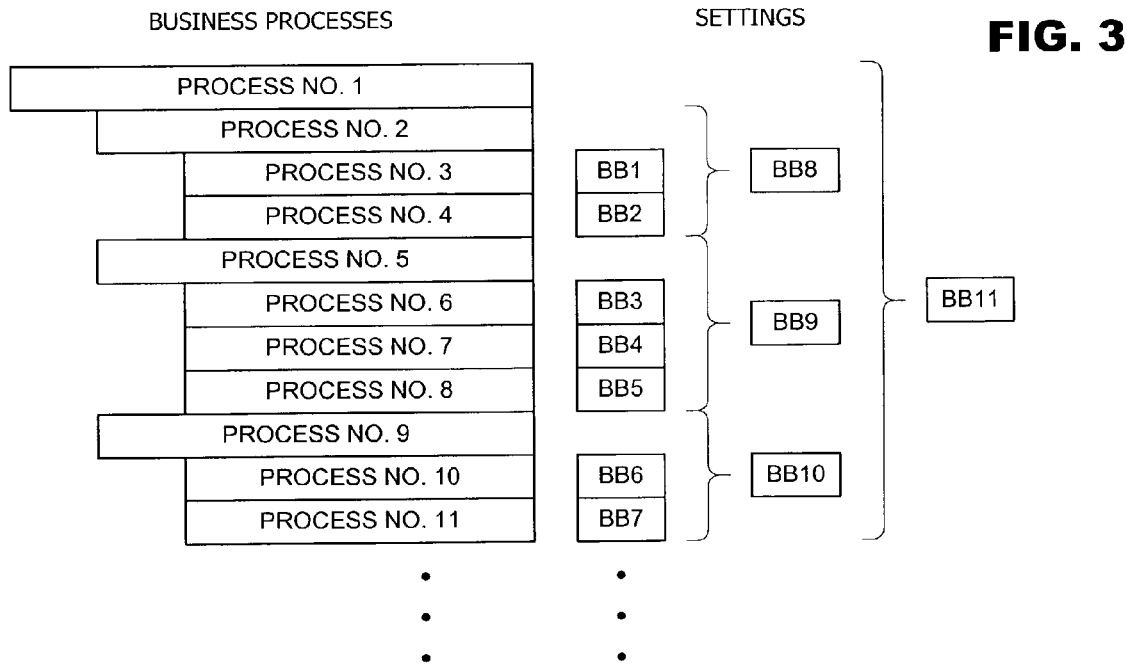
FIGS. 3 and 4 are diagrams illustrating the relationship between building blocks and business processes according to an embodiment of the present invention.
Figure 4:
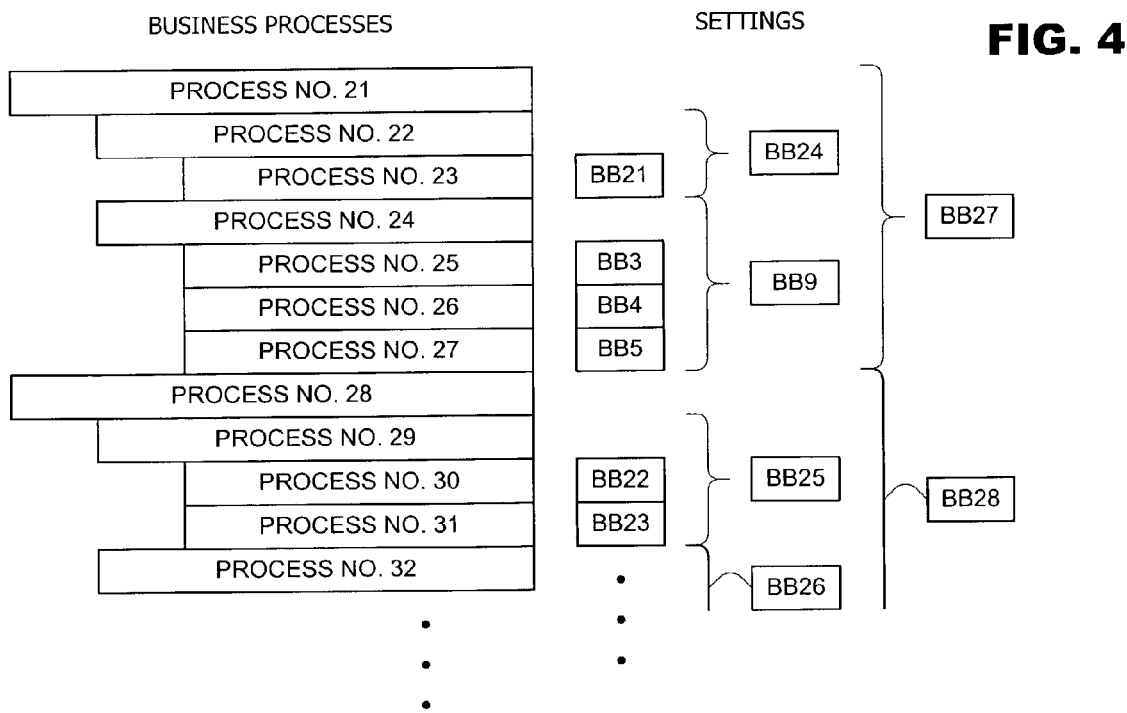

FIGS. 3 and 4 are diagrams illustrating the relationship between building blocks and business processes that are to be used by a customer following installation of the EMS system. In FIG. 3, an exemplary set of eleven business processes are illustrated. The business processes are shown in a hierarchical outline structure in which smaller business processes (e.g., nos. 3 and 4) are shown as part of larger business processes (no. 2). The larger business processes themselves may be members of even larger business processes, as processes 2, 5 and 9 are shown as members of business process no. 1.

According to an embodiment of the present invention, building blocks may be designed to coincide with a customer's business processes. Thus blocks BB1 & BB 2 are shown as corresponding to business processes 3 and 4. Similarly, blocks BB3-BB5 correspond to processes 6-8 and blocks BB6-BB7 correspond to processes 10 and 11. Just as a customer may use business processes that are members of larger business processes, building blocks may be included as members of larger building blocks. FIG. 3, therefore, illustrates building blocks BB8-BB10 are shown in FIG. 3 as containing subordinate building blocks and building block BB11 as including building blocks BB8-BB10.

FIG. 4 illustrates a second exemplary set of business processes 21-32 that might be used by a second customer. Again, building blocks may be designed to support these business processes. In the example of FIG. 4, it is assumed that the business processes 24-27 are the same as those of business processes 5-8 in FIG. 3. Accordingly, the same building block (BB9) may be used in the installation of an EMS system in both examples. For those business processes that are unique to a customer, a unique building block may be designed.

Building blocks, therefore, provide a mechanism through which an installer may select among a plurality of pre-defined settings to meet the business practices of his customer in an economical manner. Building blocks provide the functionality of business processes in a reusable manner, making them available for installation at multiple client sites. Building blocks also provide a convenient mechanism through which to merge the pre-defined settings with another set of settings that may be written in a customized manner. In the examples provided in FIGS. 3 and 4, for instance, building block BB9 is common to both installations. Other building blocks BB24 and BB28, from FIG. 4, may have come from a library of pre-defined building blocks or may have been written as a custom solution for the particular customer being supported. Building bocks additionally may be combined with previously installed settings of a target system, for example, to expend functionality of the target system.

Figure 5:
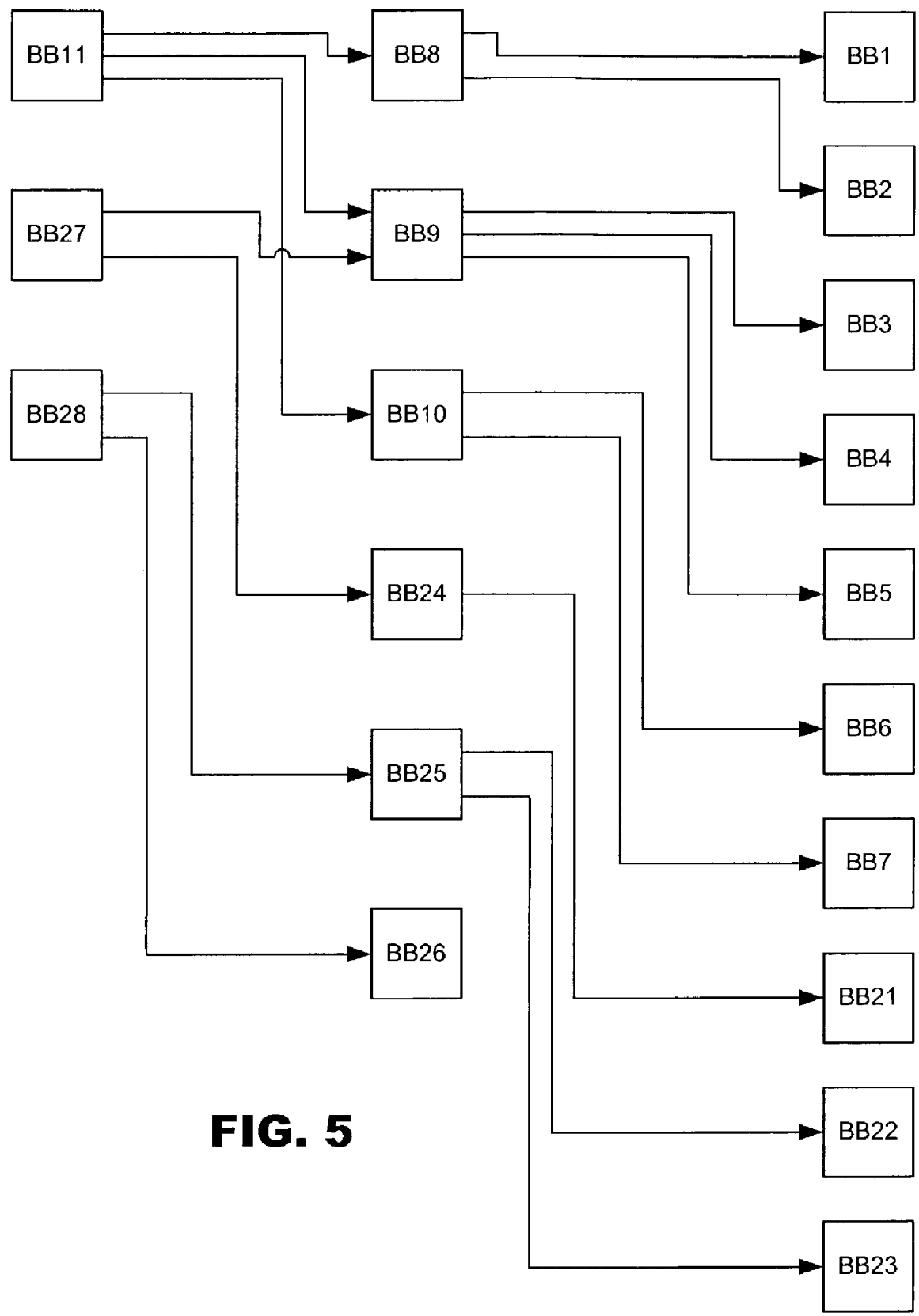
FIG. 5 is a hierarchical view of building blocks according to an embodiment of the present invention.

FIG. 5 illustrates relationships among the various building blocks of FIGS. 3 and 4. In an embodiment, an installation tool may provide a graphical user interface that indicates the availability of all the building blocks BB1-BB11 and BB21-BB28 for use in a new installation project. Selection of building block BB27, for example, would cause building blocks BB3-BB5, BB9, BB24 and BB21-BB23 to be included for installation. In some embodiments, the user interface need not indicate the nested relationships that exist among the various building blocks. Instead, the building blocks may be organized by subject matter, by industry or according to some other intuitive organization structure. Thus, it is possible that an installer will select a given building block multiple times as would occur in the example of FIG. 5 if the installer selected both building blocks BB4 and BB27.

Figure 6:
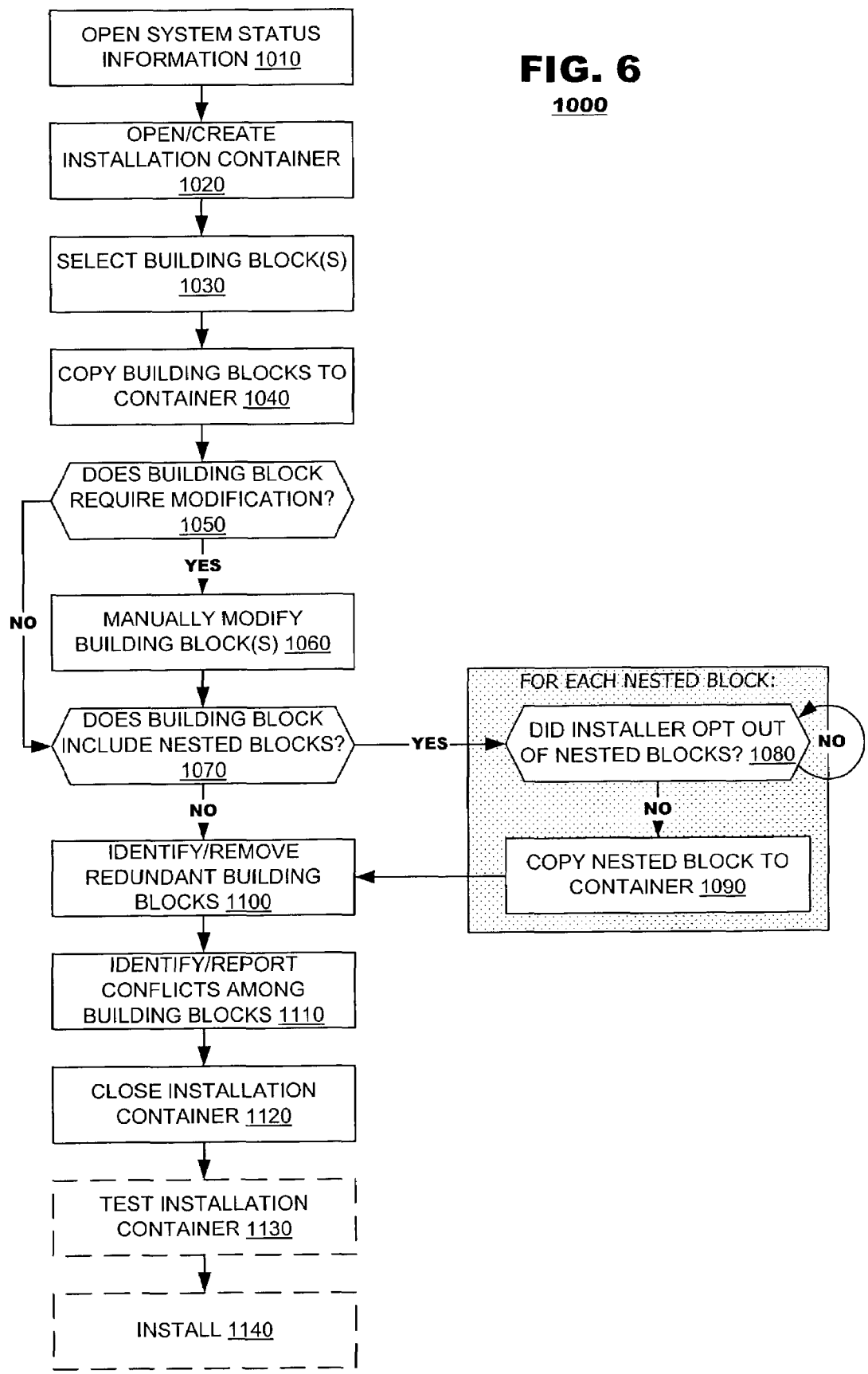
FIG. 6 is a diagram of a method according to an embodiment of the present invention.

FIG. 6 illustrates a method 1000 according to an embodiment of the present invention. This method may be used by a tool to select one or more building blocks for installation. According to an embodiment, the method may begin by opening system status information of the client site to determine any settings that may have been installed during a prior installation of the EMS system (box 1010). If no prior installation exists, this step may be omitted. Thereafter the method may create an installation container (box 1020) and, optionally, may illustrate any building blocks that are present on the client site by virtue of a prior installation. The method may permit an operator to select one or more building blocks pursuant to the new installation (box 1030). The selected building blocks may be copied to the installation container (box 1040). For each selected building block, the method may determine whether the building block requires manual modification (box 1050). If so, the method may prompt the operator to enter information to make the necessary modifications to the building block (box 1060). Typically, a block would require manual modification when the block includes settings that are specific to the computer system on which the settings will run.

Once building blocks are selected for the new installation, the method may determine whether the selected building blocks include other subordinate building blocks (herein "nested" building blocks) (box 1070). If so, for each nested building block, the method determines whether the operator opted against using the nested block (box 1080). If not, the nested block may be added to the container (box 1090). Additionally, the method may determine whether manual modification of the nested blocks is required and, if so, may prompt the operator to enter sufficient information to so modify the nested building block (operation not shown in FIG. 6). Operations 1080 and 1090 may repeat for other building blocks that are subordinate to the nested building blocks, until all building blocks that are "reachable" from the selected building blocks (i.e., referenced directly or indirectly thereby) have been so processed.

Upon the conclusion of operations 1040 and 1090, the installation container may include a plurality of building blocks, some of which were selected directly by the operator, some of which were selected by other building blocks and others of which may have been included due to prior installations on the client platform. As noted, it may occur that a given building block may have been copied to the installation container multiple times. Thus, the method may review the installation container for multiple occurrences of building blocks and remove redundant blocks (box 1100). It also may occur that multiple building blocks are in conflict. For example, newly selected building blocks may cause settings from previously installed building blocks to be overwritten. The method also may review the settings information of each building block to determine if they point to the same portions of business logic and, if so, identify a potential conflict to an operator (box 1110). In this regard, the method can help guard against installation errors that might otherwise occur through selection of incompatible building blocks. Thereafter, the method may close the installation container (box 1120).

The foregoing method provides a tool through which to build an installation container. This installation container is a software object that includes, through its associated building blocks, information to install settings for an EMS system. In those instances where the installation container is populated entirely by pre-fabricated building blocks taken from, for example, a library of the blocks, the process of building an installation container and performing an installation of the EMS system is expected to be much simpler and less time consuming than the traditional process of drafting the settings manually.

Once the installation container has been completed, it represents the step-by-step installation procedure for the customer specific EMS system. FIG. 6 illustrates additional steps involving the installation (box 1130) using the installation container. Typically, the installation is performed on a computer system that is isolated from the customer's system on which a final installation is to occur. Following the installation, an operator may perform various test procedures of the system according to documentation and other information contained within the building block to confirm that the system is operating according to desired business processes (box 1140). After the test the system may be turned (or copied) to a productive customer system.

As described above, an operator may be provided with an opportunity to modify some of the building blocks that are selected (boxes 1050, 1060). For ease of use, it might be desired to present a single building block to an operator that contains settings sufficient to cover a wide variety of installation environments. For example, as discussed above, EMS systems can include business logic to manage business processes involving SCM, CRM, PLM and ERP, among others. A given customer may purchase software applications for one or more of these processes. Settings for a given application (e.g., ERP) can be different if the customer chooses to integrate the application with both SCM and CRM than if the customer chose to integrate it with CRM alone. To simplify operation of the installation tool, it may be beneficial to provide a single building block that includes multiple sets of independent settings, each set intended for a unique installation scenario. In this case, manual modification can prompt an operator to provide sufficient information regarding the installation scenario at hand to permit one of the sets of settings to be chosen for installation. The selected set of settings may be added to the installation container and all other sets may be discarded.

The principles of the foregoing embodiments also permit additional information to be entered by an operator during installation. Settings information, as described herein, typically involved information that defines business processes that are to be implemented by an EMS system. Building blocks also can include other processes that define communication events on a target system and how to handle them. During an installation, an operator may enter customer-centric data on which the EMS system will operate, such as names of manufacturing plants, facilities, organizational structures, materials and the like.

The creation of an installation container, adaptation of the installation container to customer data and settings modification also can involve substantial work on the part of an installer. Accordingly, it is within the scope of the present invention to permit the installation container to be copied and installed on multiple target systems. Additionally, the method of FIG. 6 may operate on a copied installation container to permit the operations of boxes 1030-1120 to be run thereon.

It may prove more efficient to open and modify an existing installation container than to begin a new installation container entirely from scratch.

The foregoing description has presented the building block as containing settings information that, when installed on a client system, can cause an EMS system to perform a defined business process. According to further embodiments of the present invention, building blocks additionally may include one or more of the following:

Documentation: Reference documentation for use by customer operators when performing the business process itself. The documentation may include descriptive material regarding setup, management and data entry functions that can be performed by the business process.

Installation Interface: Data that defines a user interface during installation. The user interface may prompt an installer, for example, for information that permits the building block to interact with customer databases.

Forms: Forms associated within the business processes represented by the building block.

Test Procedure: Test methodology and processes that can be employed during installation to determine whether the building block's settings have been installed correctly and have been mapped to the customer's data appropriately.

As noted, the structure and content of a building block is determined by the business process that it is intended to achieve. By extension, the decision to include one or more of these additional features is likely to be based on the business process that the building block will achieve and the level of support that is extended to the installer.

Within the market of EMS systems, it is conventional for publishers of EMS systems to work cooperatively with the installers of these systems to develop "best practices" within particular industries. For example, various installers within a given industry (say, the automotive industry) may develop an experience base after years of working with the EMS system and with customers in the automotive industry. From their experience, these installers may identify certain best practices—business processes that provide improved performance within the relevant industry—and communicate these best practices to the EMS publisher. Conventionally, the EMS publisher would integrate settings corresponding to these best practices into the published EMS system and release them back to the installers. This collaborative process provides advantages to all the installers by providing improved performance to the EMS system.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A method of configuring a first computer system to implement a set of business processes, the first computer system comprising a plurality of business logic function modules and a stored settings module, the method comprising:

initializing an installation container on a second computer system, responsive to a selection of features corresponding to steps of a customer's predetermined business process, selecting, from a library of preconfigured building blocks, one or more building blocks for inclusion in the container, the building blocks including:

settings information that, when installed in the stored settings module, defines: at least one business logic function module to be used to implement each step of the business process, the interconnection of the individual steps to implement the business process, and communication processes used by at least some of the business logic function modules to access a plurality of databases on a plurality of servers of the first computer system;

forms and documentation that, when installed on the first computer system. implement a user interface to the steps of the business process, including access to and manipulation of data stored in the plurality of databases;

an installation interface that, during installation of the selected building blocks on the first computer system, prompts for information used to connect components of the building blocks to the plurality of databases on the plurality of servers; and a test component configured to determine if components of the selected building blocks map correctly to customer data stored in the plurality of databases on the plurality of servers;

closing the installation container; and installing the selected building blocks on the first computer system using the installation container.

2. The method of claim 1, further comprising:
determining whether the selected building block references another building block from the library, and
adding the other building block to the installation container.

3. The method of claim 1, further comprising:
determining whether a building block requires manual modification prior to installation, and
if so, prompting an operator for modification data.

4. The method of claim 1, further comprising:
from a root building block, identifying all building blocks referenced thereby and all other building blocks reachable from the root building block,
for each reachable building block:
determining whether an operator has opted against installing the respective building block, and
if not, including the respective building block in the container.

5. The method of claim 1, wherein the building blocks possess a hierarchical structure, with certain building blocks provided as members of other building blocks.

6. The method of claim 1, further comprising, when a building block is selected for inclusion, all other building blocks referenced by the selected building blocks are included in the container.

7. The method of claim 6, further comprising, prior to the installing, identifying duplicate building blocks and removing all but one of them.

8. The method of claim 1 wherein at least one building block included in the installation container contains settings implementing best practices of the customer's industry.

9. The method of claim 1 wherein the selected features define at least one of a supply-chain management process, a customer relationship management process, a product lifecycle management process, an enterprise resource planning process, an accounting process, a technology support process, and a human resources process.

10. The method of claim 1 wherein the settings, when installed, cause the computer system to implement a workflow associated with the business process.

11. The method of claim 1, further comprising:
including in the installation container, of the building blocks in the library of building blocks, only the selected building blocks and building blocks dependent on the selected building blocks.

12. The method of claim 1, wherein at least one building block includes a plurality of different predetermined sets of settings information to implement a plurality of different predetermined business processes; and
the method further comprises:
selecting the at least one building block; and
selecting one of the plurality of predetermined sets of settings information of the at least one building block.

13. The method of claim 1, wherein the features of the business process are presented for selection in a manner organized according to at least one of: subject matter of the business processes, or industry of the business processes.

14. The method of claim 1, further comprising:
determining if the settings information for a plurality of different selected building blocks point to same portions of a business logic; and
upon a positive determination that settings information for a plurality of different selected building blocks points to same portions of a business logic, providing an indication of a possible settings conflict.

15. The method of claim 1, further comprising:
determining, based on a configuration of the customer computer system, whether a selected building block requires manual modification prior to installation; and
upon a positive determination that a selected building block requires manual modification prior to installation, prompting for modification data.

* * * * *